Oct. 14, 1958  D. FIRTH  2,856,047
FLUID PRESSURE OPERATED CLUTCH
Filed Feb. 7, 1952  2 Sheets-Sheet 1

INVENTOR:-
DAVID FIRTH
BY:-
Spencer, Johnston, Cook & Root
ATT'YS

Oct. 14, 1958  D. FIRTH  2,856,047
FLUID PRESSURE OPERATED CLUTCH
Filed Feb. 7, 1952  2 Sheets-Sheet 2
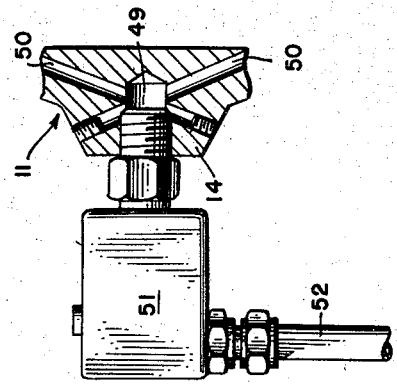
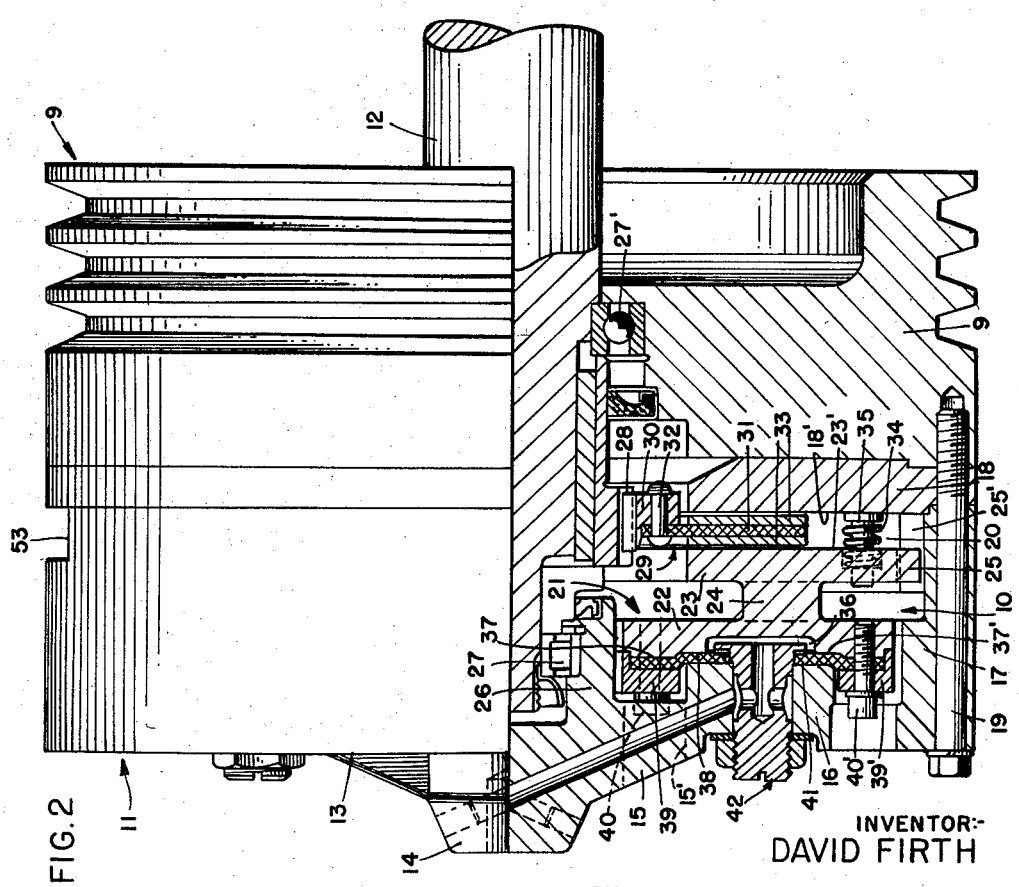
INVENTOR:-
DAVID FIRTH
BY:-
Spencer, Johnston, Cook & Root
ATT'YS United States Patent Office 2,856,047
Patented Oct. 14, 1958

2,856,047
FLUID PRESSURE OPERATED CLUTCH

David Firth, South Bend, Ind., assignor to Dodge Manufacturing Corporation, Mishawaka, Ind., a corporation of Indiana Application February 7, 1952, Serial No. 270,309

1 Claim. (Cl. 192—88)

The present invention relates in general to the transmission of mechanical power and has more particular reference to an improved driving clutch structure.

An important object of the present invention is to provide an improved cushioning effect in a torque transmitting clutch structure; a further object being to provide a torque transmitting clutch having improved fluid pressure operated means for controlling the operation of the clutch; a still further object being to provide for the operation of the clutch in response to the movement of relatively small minimal quantities of the clutch operated fluid to thereby provide exceedingly rapid clutch engaging and disengaging operation.

Another important object is to provide improved means in a torque transmitting clutch structure for automatically compensating for wear in the operating elements of the clutch.

Another important object is to provide improved means for the effective dissipation of frequently generated heat in a clutch structure of the character mentioned.

Another important object is to provide a flexible member for containing a fluid operating medium, in a clutch structure of the character mentioned, and to arrange such member in novel fashion in the structure whereby to facilitate and minimize the cost of the assembly of the several parts of the device and also to effectively insulate the flexible fluid containing member against heat, to thereby prevent heat induced deterioration of the flexible element during the service life of the clutch structure.

Another important object is to provide a clutch structure of the character mentioned embodying a minimum number of parts of relatively simple shape to thereby effect simplicity and economy of construction, and to facilitate the initial assembly of the device as well as the replacement of parts when necessary during the service life of the clutch structure.

The foregoing and numerous other objects, advantages and inherent functions of the invention will become apparent as the same is more fully understood from the following description which, taken in conjunction with the accompanying drawings, discloses a preferred embodiment of the invention for the purpose of demonstrating the same.

Referring to the drawings:

Figure 2 is a partially sectionalized view taken substantially along the line 2—2 in Figure 1 showing the structure in its released or disengaged condition;

Figure 3 is a sectional view of a portion of the structure shown in Figure 2 illustrating means, not shown in Fig. 2, for connecting the clutch structure with an external source of clutch actuating fluid;

Figure 4 is a fragmentary sectional view of the structure shown in Figure 2, illustrating the parts in clutch engaged position;

Figure 5:
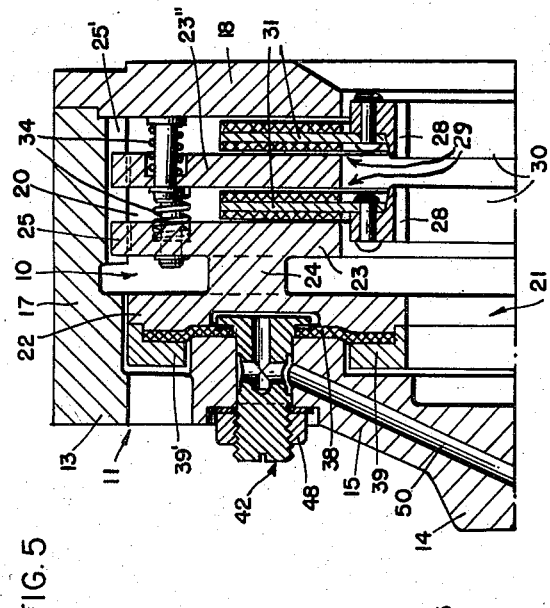
Figure 5 is a partially sectionalized view illustrating the invention as applied in a multiple stage structure, the preceding figures showing the invention as applied in single stage clutch structures.

To illustrate the invention the drawings show a fly or pulley wheel 9 and clutch means 10, enclosed in a housing 11 and operable selectively to drivingly connect the wheel 9 with a shaft 12. The housing 11 is preferably demountably connected with and secured to the wheel 9 whereby the same form a unitary housing and fly or pulley wheel structure. It should, of course, be understood that the clutch means 10 may be employed to drivingly connect the wheel structure with the shaft to drive the same, or to form a torque transmitting coupling for the purpose of driving the wheel from the shaft.

The housing 11 preferably comprises a cylindrical member open at one end, for connection with the fly or pulley wheel 9, and formed at its other end with a preferably integral end wall 13. The wall 13 may be formed centrally with a boss 14 and radial legs 15 providing a spider portion defining spaced openings 15' around the central boss. The end wall 13 may also comprise an annular web portion 16 extending outwardly of the spider portion and carrying a cylindrical rim 17, forming the peripheral portions of the housing 11. The wheel 9, as shown, is preferably formed as a separate element on which the casing 11 may be secured in any suitable or preferred fashion, as by means of bolts 19 penetrating the rim 16 and threadedly engaging the rim of the wheel 9. The wheel 9, of course, may be configurated in any suitable or preferred fashion to serve as a flywheel or as a pulley. The housing also preferably includes an annular friction plate 18 which may be secured to the rim 17, as by means of the bolts 19, whereby the casing may define an enclosed space or chamber 20 for receiving the clutch means 10 within the rim 17 and between the member 13 and the plate 18, said plate having a flat and preferably smooth finished surface 18', facing inwardly upon the space 20.

The clutch means 10 preferably comprises an annular circular shoe structure or member 21 disposed within the space 20 for limited movement therein in a direction axially of the shaft 12 toward and away from the annular plate 18. The shoe member 21 may comprise a structure embodying a pair of annular plate portions 22 and 23 rigidly secured together in spaced relationship in any suitable or convenient fashion. Preferably the plate portions 22 and 23 are integrally united as by joining means 24 disposed annularly between the plate portions, which joining means may comprise a plurality of spaced bosses circularly arranged between the plate portions 22 and 23 and integrally united therewith, said bosses defining circumferentially spaced vent openings therebetween for the circulation of a cooling fluid, such as air, between the plate portions 22 and 23. Alternately the means 24 may comprise a separately formed member or members, and the plate portions 22 and 23 may be secured together rigidly by fastening members, such as bolts, penetrating the same and the separately formed means 24. If desired, such separately formed means 24 may comprise heat insulating material for purposes hereinafter more fully revealed.

In order to prevent relative rotation of the annular structure 21 within and with respect to the casing 11, the peripheral edge of the plate portion 23 and the inner surface of the rim 16 may be formed respectively with interfitting spline means 25 and 25', the same preferably comprising integral interfitting teeth formed on and at the marginal edge of the plate portion 23 and on the inner face of the rim 16.

The annular plate portion 23 provides a flat, preferably smooth finished surface 23' in parallel facing relationship with respect to the surface 18'. The shaft 12 is adapted to extend concentrically within the casing 11 through the plate 18 and the annular structure 21. Any suitable or preferred means may be provided for journaling the wheel and housing structure on the shaft 12. To that end, the casing may be formed centrally with an internal sleeve portion 26 providing support for a bearing 27 at the inner end of the shaft; and bearing means 27' may also be provided for turnably supporting the wheel 9 on the shaft. The shaft also may carry a driving gear 28, keyed to the shaft and secured thereon in any suitable or preferred fashion. This driving gear 28 serves to drivingly connect a clutch disk element 29 with the shaft 12, said disk element comprising a hub 30 formed with internal gear teeth adapted for driving engagement with the teeth of the gear 28. The hub 30 consequently is axially slidable on and drivingly connected with the shaft 12. The hub 30 also carries a preferably steel driving disk 31 which may be secured to the hub as by means of rivets 32. The driving disk 31 may carry friction facings 33 on the opposite sides thereof, said facings preferably comprising annular elements secured to the disk 31 as by rivets or other suitable fastening expedient.

The disk 31 and its facings 33 are carried on the shaft 12 in position extending between the facing surfaces 18' and 23'. Accordingly, the wheel structure 11 and the shaft 12 may be drivingly connected when the annular structure 21 is shifted axially, in the wheel structure 11, into clutch engaging position squeezing the plate 31 and its facings 33 between the facing surfaces of the annular plate members 18 and 23. The wheel structure 11 and the shaft 12 may be drivingly disconnected upon retraction of the annular structure 21 axially away from the plate 18 to release the disk 31 and its facings 33 between the plates 18 and 23. Spring means, preferably comprising helical springs 34, circularly spaced apart in the structure, may be provided for normally urging the annular structure 21 toward retracted or clutch released position, said springs being preferably mounted, between the plates 18 and 23, in position encircling stems or pins 35. These pins are preferably slidingly mounted in apertures formed in the plate 23 in position to bear against the inner face of the plate 18 outwardly of the driving disk 31.

Fluid pressure means is provided in the casing 11 for moving the annular structure 21 against the influence of the springs 34 toward clutch engaging position. To this end, the plate portion 22 is formed with a preferably shallow annular groove 36 facing toward the web portion 16 of the plate-like member 13, said plate portion 22 being provided with raised concentric gasket edge seats 37, 37' respectively at the inner and outer edges of the groove 36. These seats are adapted to engage and support the inner and outer concentric edge portions 38a and 38b of a disc-shaped annular or ring diaphragm or gasket 38 of flexible material. The inner and outer edge portions of the diaphragm 38 may be clampingly secured in fluid-tight fashion on the seats 37 and 37' by means of clamping rings 39 and 39' secured to the plate portion 22 in any suitable fashion and preferably by studs 40 and 40'.

The web portion 16 of the member 13 is formed with an annular inwardly facing seat 41 in position overlying the diaphragm 38 between the edges 38a and 38b thereof which are clampingly secured to the seats 37 and 37'. The groove 36 and the diaphrgam 38 form an annular expansible fluid pressure chamber between the annular structure 21 and the seat 41 of the member 13. Means is provided for admitting fluid, such as air under pressure, to such fluid pressure chamber to expand the same between the annular structure 21 and the member 13 and thereby thrust the annular structure 21 axially in the wheel structure, against the influence of the springs 34, in a direction to compress the disk 31 and its facings 33 between the plate members 18 and 23, whereby to engage the clutch and maintain the same in engaged position so long as fluid, at clutch engaging pressure, is maintained in the expansible chamber formed by the groove 36 and the diaphragm 38.

Figure 6:
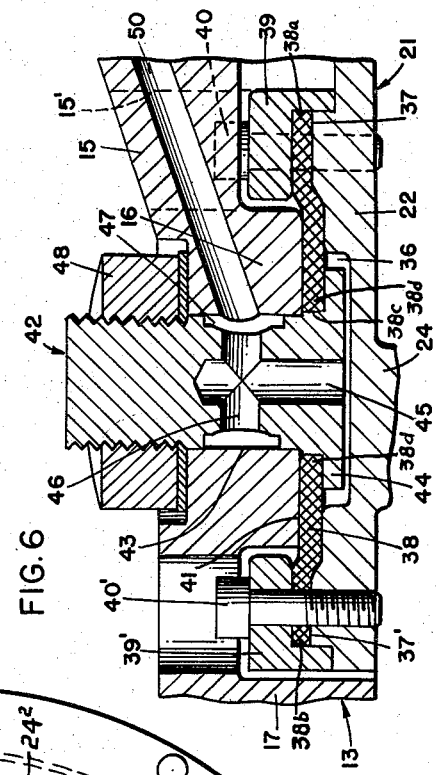
Figure 6 is a sectional view of an element that is employed in the structure.
Figure 1:
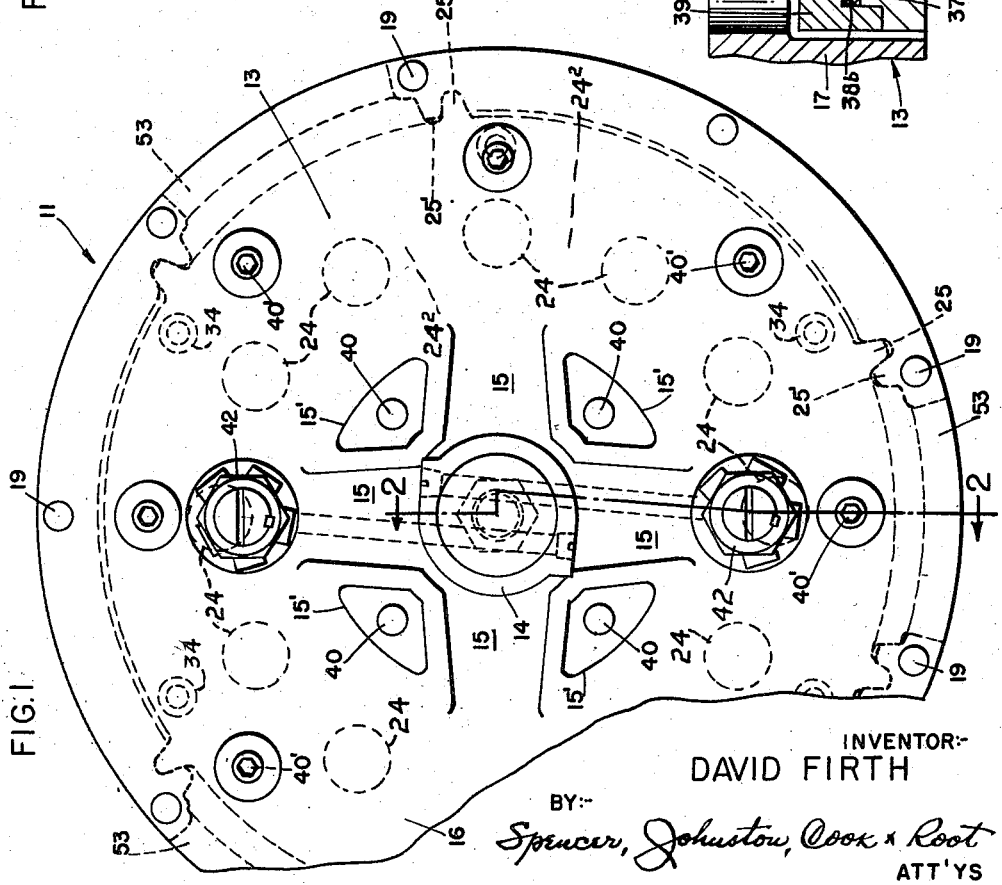
Figure 1 shows a clutch structure embodying the present invention as viewed axially from one end thereof.

In order to provide for the admission of fluid under pressure to the expansible chamber, the web portion 16 of the member 13 may be provided with one or more fluid clamps or fittings 42 of the sort shown in Fig. 6 and disposed in position communicating with the expansible chamber. To this end, the web portion 16 of the member 13 may be provided with a bore 43 for each fitting. Each bore may open on the inwardly facing seat 41 and also outwardly of the member 13, the medial portions of the diaphragm 38 being formed with openings 38c in alignment with said bores 43. Each of the bores 43 is adapted to receive a corresponding fitting 42. Each fitting preferably comprises a stem having a flanged head 44 at the inner end aligned with the groove 36 and provided with screw threads at the other end. It may be noted in Fig. 6 that, when the clutch is disengaged, the inner end of each fitting 42 is received within the groove 36, thereby enhancing the compactness of the clutch. The stem may be formed with an axial bore or duct 45 opening at the headed end of the stem and extending thence to the medial portions thereof, said axial bore communicating with radial apertures 46 opening upon the sides of the stem, which may be and preferably are cut-away as at 47 to define an annular space within the bore 43 in which the stem is mounted. Each stem thus may extend through a corresponding opening in the diaphragm 38 and in a bore 43, in position such that the flanged head 44 of the stem may clampingly secure portions 38d of the diaphragm 38 upon the seat 41 at a diaphragm opening 38c, the stem being clampingly and sealingly secured in the bore 43 as by means of a fastening nut 48 threadingly engaged with the threaded end of the stem, and bearing on a seat formed in the outer face of the web portion 16 of the member 13.

The central boss 14 may be formed with an axial chamber 49 which, in turn, may be connected with the medial portions of the apertures 43 by means of ducts 50 formed in the radial legs 15, thereby hermetically connecting the expansible chamber through the fittings 42 and the ducts 50 with the chamber 49. A rotary seal device 51 may be secured on the casing 11 for the purpose of connecting the chamber 49 with a preferably flexible conduit 52 which, in turn, may be connected with a suitable external source of fluid, at clutch actuating pressure, through any suitable or preferred valve means for controlling the supply of fluid from said source, through the conduit 52 and seal means 51, to the chamber 49. Accordingly, the clutch mechanism may be selectively operated in response to the valve controlled admission of fluid under pressure in the expansible chamber whenever and so long as it is desired to engage the clutch.

It should be understood that operation of the clutch mechanism will result in the generation of heat as the result of the frictional action of the plates 18 and 23 on the disk 31 and its facings, and vice versa. Heat thus generated in the plate 23 of necessity will be dissipated in the space 20 and also to some extent through the bosses 24 to the plate portion 22. Transfer of such heat to the plate 22, however, is minimized through the employment of bosses 24 of limited size between the plate portions 22 and 23, or by forming the bosses of heat insulating material 24', as shown in Fig. 4. As a consequence, most of the heat generated in the plate portion 23 will be delivered in the space 20 rather than to the plate portion 22. The rim 17 also may be and preferably is formed with peripherally spaced vent openings 53 so that when the casing 11 is in rotation, centrifugal action will result in a continuous flow of air through the wheel structure, at the openings $24^2$ provided between the spaced embossments 24 or 24', to thereby draw off rapidly the heat dissipated from the plate 23 and thus cool the plate portions 22 and 23, such air flow being admitted into the structure through the openings 15' defined between the legs 15.

The flexible diaphragm 38 thus is maintained in relatively cool condition at all times. The action of the mechanism is such that the medial portions of the diaphragm are always held against the seat 41 which is the coolest member of the clutch structure. Only the clamped edges of the diaphragm engage the plate portion 22, which is kept relatively cool by air circulation through the chamber 20, and to which heat may penetrate only with difficulty from the plate portion 23 in which the heat is generated. The arrangement substantially assures the diaphragm against exposure to undue heat and consequently deterioration, thereby promoting the service life of the diaphragm.

The clutch structure also operates with unusual rapidity since the required movement of the structure 21 from retracted to clutch engaging position is relatively small. The expansible chamber provided by the groove 36 and the diaphragm 38 likewise is relatively small so that effective quantities of clutch actuating fluid may be applied in the chamber substantially without time lag, whereby the clutch may be engaged almost instantaneously upon the application of fluid pressure in the expansible chamber.

As shown more particularly in Figure 5 of the drawings, the present invention may be incorporated in multiple stage clutch structures by providing a plurality of disk elements 29 on the shaft and in splined driving relationship therewith, and by providing an additional annular plate member or members 23" between each pair of adjacent driving disk elements 29. The additional plate member or members 23" may be essentially like the plate portion 23 and may be formed peripherally with teeth, like the teeth 25 of the plate portion 23, for splined engagement with the teeth 25' on the enclosing rim 17. The auxiliary plate or plates 23", however, are formed as separate elements. The opposed faces of the additional plate or plates 23" are preferably finished smooth to provide friction surfaces for engagement with the facings of the elements 29. Clutch releasing spring means, like the releasing spring means 34, may of course be provided between the plates 18 and 23 and the auxiliary plate or plates 23".

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein being preferred embodiments for the purpose of illustrating the invention.

The invention is hereby claimed as follows:

A clutch including driving and driven members, said driving member comprising an annular friction plate, abutment means forming an annular seat disposed in spaced facing relation with respect to said friction plate, a cooperating movable annular shoe member mounted between the friction plate and said seat, said shoe member being formed with concentric gasket edge seats and having an annular groove between said seats in position facing said annular seat, a flexible disc-shaped ring diaphragm having inner and outer concentric edge portions sealed to said shoe member at said concentric gasket edge seats formed therein and coacting with said shoe member to define an annular expansible fluid pressure chamber, said diaphragm having medial portions overlying said annular seat on one side and spaced from the bottom of the groove on the other side and having at least one opening therein, said abutment means having a fluid conduit in communication with said expansible chamber through said opening in the medial portions of said diaphragm, and a clamp member mounted on the abutment means and extending in said diaphragm opening in position to sealingly secure on said annular seat the diaphragm portions surrounding said diaphragm opening, said clamp member having a duct therethrough in open communication with the expansible chamber and the conduit in the abutment means, the inner end of said clamp being in axial alignment with said groove and received in said groove when the clutch is disengaged, said driven member having a disc arranged between said friction plate and said shoe member whereby fluid pressurizing of said chamber actuates said shoe member to clamp the disc between the shoe member and the friction plate thereby connecting said driving and driven members.

References Cited in the file of this patent

UNITED STATES PATENTS

| | | |
|---|---|---|
| 1,759,755 | Linder | May 20, 1930 |
| 2,290,542 | Criley | July 21, 1942 |
| 2,341,587 | Andres et al. | Feb. 15, 1944 |
| 2,359,516 | Frank | Oct. 3, 1944 |
| 2,379,972 | Lambert | July 10, 1945 |
| 2,462,944 | Cardwell et al. | Mar. 1, 1949 |
| 2,481,834 | Foster | Sept. 13, 1949 |
| 2,517,972 | Cardwell | Aug. 8, 1950 |
| 2,581,637 | Danly et al. | Jan. 8, 1952 |
| 2,587,230 | Schaad | Feb. 26, 1952 |
| 2,588,724 | Hobbs et al. | Mar. 11, 1952 |
| 2,774,453 | Wilson | Dec. 18, 1956 |